Jan. 20, 1970     H. STEUER     3,490,301

INFINITELY VARIABLE CONE PULLEY TRANSMISSION

Filed July 22, 1968     2 Sheets-Sheet 1

INVENTOR.
HERBERT STEUER
BY

Jan. 20, 1970  H. STEUER  3,490,301
INFINITELY VARIABLE CONE PULLEY TRANSMISSION
Filed July 22, 1968  2 Sheets-Sheet 2

INVENTOR.
HERBERT STEUER
BY

United States Patent Office 3,490,301
Patented Jan. 20, 1970

3,490,301
INFINITELY VARIABLE CONE PULLEY TRANSMISSION
Herbert Steuer, Bad Homburg, Germany, assignor to Reimers Getriebe A.G., Zug, Switzerland
Filed July 22, 1968, Ser. No. 746,335
Claims priority, application Germany, July 25, 1967, P 42,674
Int. Cl. F16h 55/52
U.S. Cl. 74—230.17                                6 Claims

ABSTRACT OF THE DISCLOSURE

An infinitely variable cone pulley transmission wherein solely the control forces required for setting, maintaining and changing the ratio are supported by means of a pair of control levers, the additional forces being mutually supported against a separate transfer lever which is slewable relative to the transmission.

BACKGROUND OF THE INVENTION

Field of the invention

The present invention relates to an infinitely variable cone pulley transmission with a transmitting element running between the sets of disks, wherein the ratio of the transmission can be adjusted by means of a pair of control levers which are slewably arranged between the sets of conical disks.

Such infinitely variably adjustable gears are usually provided with pairs of conical disks of metal or plastic material. Between these pairs of conical disks, which are arranged on two shafts, there is located a dry running belt of rubber or synthetic rubber, for instance a V-belt, and this belt effects the power transmission from the driving shaft to the driven shaft. However, since the forces which can be transmitted in this manner are relatively low, one also finds transmissions of this kind in which the conical disks are provided with cogging and in which the power transmitting element is designed as a composite chain. But in this latter case, too, there is a limit to the force which can be transmitted; the reason for this is that a certain running speed of the transmission may not be exceeded on account of the weight of the chain and the constant meshing of the cogging between the composite chain and the cogged conical disks. Finally, conical pulley transmissions are known in which the conical disks have a smooth hardened surface and cooperate with chains. These chains are composed of individual elements, and such a set-up permits higher specific forces and higher running speeds. In all cases indicated in the foregoing, the transmitting elements can of course be combined in parallel arrangement to form a group, in order to increase the capacity which can be transmitted by the transmission. If there is to be a power transmission at all from the driving pair of conical disks to the driven pair of conical disks, then there must be a certain tension in the transmitting element. This tension is usually obtained by means of what is know as a tensioning spindle. With the aid of this tensioning spindle, the conical disks of each pair are brought closer together, with the result that the transmitting element is forced out to a greater running radius and thereby tensioned. As a rule, however, this measure is not sufficient, since in the course of time the wear and the operating load stretch the transmitting element, and since moreover the control levers which determine the transmission ratio are elastically deformed to varying extents with the transmitted torque. Additional tensioning devices are therefore provided for the transmitting element; these are designed as contact pressure devices which operate on the axially displaceable conical disks of at least one pair of conical disks, such operation being a function of the torque to be transmitted, so that the transmitting element is tensioned in proportion to the load.

Such contact pressure devices are frequently designed as contact pressure rings on the appropriate shaft; these contact pressure rings are axially displaceable along but rigidly connected to the shaft so as to rotate with it. The faces of the contact pressure rings are provided with V-shaped cuts, and, if interposing roller members are now used, these cuts cooperate with equally shaped V-cuts in parts which are connected to the axially displaceable conical disk. In doing so, these contact pressure devices transfer the torque from the shaft to the conical disk or the reverse; in addition, and as a result of the action of the inclined surfaces, they also generate axially directed contact pressure forces which are proportionate to the torque.

The axial contact pressure forces generated in this manner do not always correspond to the actual requirements, it is true, since these are moreover dependent on the actually existing ratio of the transmission. But such contact pressure devices are frequently used, because it is relatively easy to manufacture them, and because the contact pressure forces—depending only on the transmitted torque—fulfill the required demands in the initial bearing.

Over and above this, however, one finds quite a number of considerably more complicated contact pressure mechanisms; these generate contact pressure forces which depend not only on the actually transmitted torque but also on the actual ratio of the transmission.

SUMMARY OF THE DISCLOSURE

The present invention is concerned with the generation of an axial contact pressure force which depends only on the torque actually being transmitted. Such generation is absolutely sufficient for very many practical cases. The invention starts with the described device which delivers such a contact pressure force and which in general is provided on the driving as well as on the driven shaft. However, one can manage with only one such contact pressure device which is provided either on the driving shaft or on the driven shaft.

Since the transmission must be capable of being adjusted to the various ratios, the contact pressure rings of the driving and/or the driven shaft—in the hitherto known contact pressure devices of this kind—are connected with the control levers for adjusting, maintaining and changing the ratio of the transmission by inserting thrust bearings, and by means of the control levers they are pushed along the associated shaft by equal amounts and in the same direction. Consequently, however, the control levers have to take up not only the forces necessary for adjusting, maintaining and changing the ratio but in addition the reaction forces corresponding to the axial contact pressure forces which depend on the torque and which must therefore be correspondingly rigidly designed. It is indeed true that such an arrangement has a most simple construction, but in practical work it has considerable disadvantages.

Since the cone pulley transmission has a ratio which is infinitely variably adjustable, for example the ratio of 1:2 stepped down or 2:1 stepped up, then at a drive torque which is presupposed as constant and at a drive speed which is presupposed as constant there result drive torques which vary in the proportion of 1:4. In the case of a ratio stepped right down, the driven torque available on the driven shaft is substantially larger than the initiated driving torque. If, therefore, the contact pressure mechanisms are the same on the driving side and on the driven side, then the tension which the transmitting element requires for the power transmission for the stepped down ratios is determined by the driven side.

Assuming, however, that the contact pressures mechanisms are the same on the driving side and on the driven side, then if the ratio of the transmission is adjusted to about 1:1 it is not clear whether the contact pressure mechanism on the driven side or the contact pressure mechanism on the driving side determines that tension of the transmitting element which is necessary for the power transmission. If the ratio is further stepped up, then the torque on the driven shaft becomes smaller than the torque on the driving shaft, meaning that now the contact pressure device of the driving shaft generates that tension of the transmitting element which is necessary for the power transmission. With this change-over of the contact pressure device determining the tension of the transmitting element, the load conditions of the control levers are also altered, and since these cannot be designed so as to be completely rigid and cannot be arranged so as to be free of play, there consequently results a not insignificant and sudden jump in the speed of the driven shaft. If a ratio corresponding to this very change-over point is desired and has been adjusted, then even the slightest non-uniformity of the load torque of the infinitely variable transmission is sufficient to cause most disagreeable oscillations between two driven speeds of revolution, even though no change has been undertaken on the setting of the ratio.

Similar considerations also apply when one of the contact pressure devices of the described type is provided only on the driving shaft or only on the driven shaft. This design is indeed easier and less expensive, but in both cases there result axial contact pressure forces which are particularly unfavourable when the contact pressure device is planned in such a manner that it is capable at all events of supplying the minimum of the required contact pressure force in one of the border-line cases of the ratio. In addition, if one considers the fact that the run of forces can be reversed, meaning that the driven shaft can become the driving shaft, then there are either contact overpressures or on the other hand contact pressures which are much too low, depending on the ratio setting and the direction or the run of forces. This also applies, though to a less extent, when one contact pressure device is provided on the driving shaft and one on the driven shaft.

If there is a contact pressure device only on the driving shaft, then such a known transmission has further and most unpleasant property, namely the transmission tends of its own accord to increase the driven speed which is adjusted. This behavior becomes particularly disagreeable since the capacity requirements of the masses moved by the transmission usually increase as the driven speed increases. It would be more acceptable if the driven speed adjusted in this ratio range tended to drop slightly. The ideal case is of course when the adjusted ratio does not change despite changes in loading.

The object of the present invention is derived from the afore-mentioned disadvantages of the known transmissions with torque-dependent axial contact pressing of the conical pulleys against the transmitting element in order to generate a tensioning of the transmitting element which is sufficient for transmitting the torque present in each case within an infinitely variable ratio range.

By eliminating a contact pressure (tensioning of the transmitting element), which for every load torque and for every adjusted ratio has the experimentally and accurately determinable value for the transmission being considered, in favour of the simplest possible constructive design with the greatest approach to the ideal values of the contact pressure, it can be achieved that the jump in speed occurring in the neighbourhood of the ratio 1:1 and caused by the change-over between the driving shaft and the driven shaft from the one contact pressure device to the other during torque-dependent contact pressure is avoided, that moreover no unnecessarily high contact pressure forces are generated in certain ratios when using only a single contact pressure device which can be arranged either on the driving shaft or on the driven shaft, that also in case of reversal of the run of forces no contact pressures can occur which are too low, and that in none of the cases considered there can occur a control force with which the transmission tends in the range of the step-up ratio to take over a higher driven speed than that corresponding to the adjusted ratio conditions. Finally, it is achieved as far as possible that the contact pressure which exists at each ratio and each torque load of the transmission achieves—without excessively large constructive expenditure—the ideal values which are experimentally determinable for a definite transmission and which characterise the border-line range in which the tension of the transmitting element is neither too large nor too small.

Beginning with an infinitely variable cone pulley transmission with a transmitting element running between the sets of disks. Wherein the ratio is adjustable by means of a pair of control levers slewably arranged between the sets of conical disks, and wherein the contact pressure device for generating torque-proportional axial contact pressure forces acting on at least one of the axially movable conical disks of at least one of the sets of disks is formed by a contact pressure ring which transfers the torque and which is axially displaceable relative to the transmission shaft and which has roller members arranged between inclined surfaces, the torque and the contact pressure force being transmitted by the roller members to the axially displaceable conical disk, the problem posed by the invention is solved in that the conical forces required exclusively for adjusting, maintaining and changing the ratio are supported in a manner known in itself by the pair of control levers and that the additional forces resulting from the contact pressure and which are directed away from the transmitting element and vertically to the running plane of same are mutually supported against a separate transfer lever which is slewable relative to the housing of the transmission.

If one contact pressure device is provided for each of the two pairs of disks, then the reaction forces exercised by the contact pressure rings—which are rigidly connected to the transmission shaft so as to rotate with this latter—are mutually supported by means of this transfer lever. If such a contact pressure device is provided for only one of the two sets of disks, then the reaction force exercised by the contact pressure ring of one set of disks on the one hand and the spreading force of the transmitting element acting on the other set of disks on the other hand are mutually supported by the transfer lever.

In any event, with the transfer lever according to the invention, either the reaction forces of the contact pressure devices on the one hand or—on the other hand—the reaction force of the contact pressure device on one transmission shaft and the spreading force between the two conical disks on the other transmission shaft are mutually supported. The pair of control levers has then the sole task of supporting—on the driving shaft—the control forces necessary for adjusting, maintaining and changing the ratio of the transmission.

In a further development of the invention, the position of the slowing axis of the transfer lever can be rendered alterable as a function of the ratio of the transmission, in order that the ratio dependency of the necessary contact pressure can be taken into consideration at least to a certain extent without a disproportionately high constructive cast. This is accomplished as explained in the following description of special exemplary embodiments.

BRIEF DESCRIPTION OF THE DRAWINGS

Exemplary embodiments of the object of the invention will be more fully understood by reference to the following specification and with reference to the drawings, with the proviso that the scope of protection of the present invention will not be restricted thereby to the illustrated exemplary embodiments. The schematic drawings show.

DESCRIPTION OF THE PREFERRED EMBODIMENTS

Figure 1:
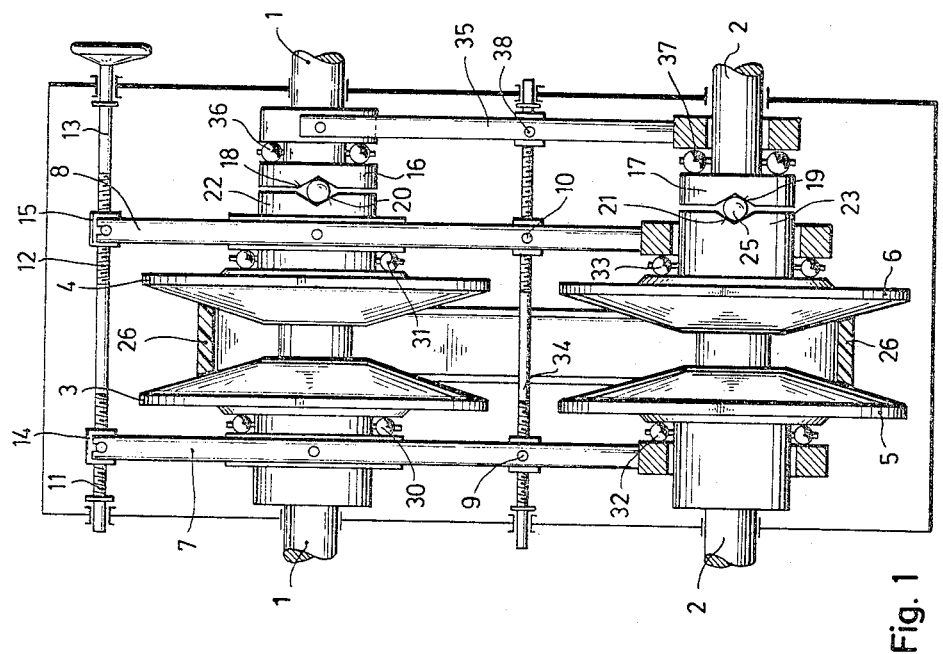
FIGURE 1A an infinitely variably adjustable transmission belonging to the known prior art, FIGURE 1 a first form of embodiment of a transmission according to the invention, FIGURE 2 a variation of the transmission design according to FIGURE 1, and FIGURE 3 a further form of embodiment of a transmission according to the invention.
Figure 1A:
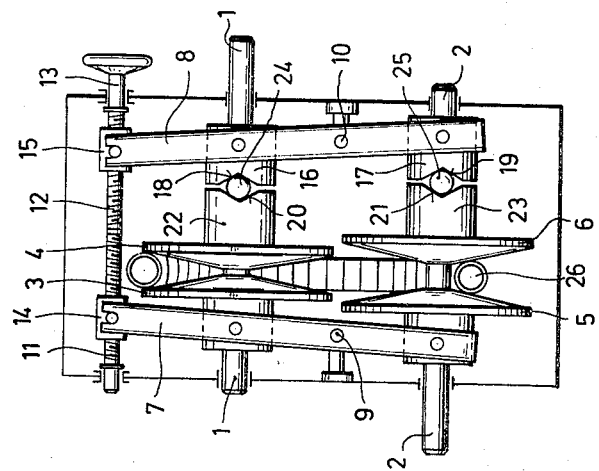

The transmission according to FIGURE 1A is taken from the known prior art and has a driving shaft 1 and a driven shaft 2. On the driving shaft 1 are two conical disks 3 and 4; on the driven shaft 2 are two disks 5 and 6 of like conical design. The two conical disks of each pair form a set of disks and can be axially displaced along their shafts 1 and 2. This is done with a pair of control levers 7, 8 each of which is slewed about a swivel journal 9, 10 rigidly attached to the housing, slewing being done with an adjusting spindle 13 provided with oppositely directed threads 11, 12. For this purpose, adjusting nuts 14, 15 are arranged on the adjusting spindle 13 and engage with pins in forks in the free ends of the two control levers 7 and 8. The control levers 7 and 8 are also connected—by means of adjusting rings and thrust bearings not shown in detail—to the conical disks 3, 5, respectively and control lever 8 is connected to the conical disks 4 and 6 having rigid therewith contact pressure rings 22 and 23. The contact pressure rings 16 and 17 are non-rotatably connected to their associated shafts 1 and 2 so as to be rotatable together with these shafts, but they can be longitudinally displaced on the shafts. They form a part of the contact pressure device. On the circumference of the front surface facing the conical disks 4 or 6, these contact pressure rings are provided with a series of V-shaped cuts 18, 19 distributed on the surface, and opposite them lie correspondingly formed V-shaped cuts 20, 21 on the front surfaces of the hubs 22, 23 of the conical disks 4 or 6. Roller members 24 or 25 are located in the V-shaped cuts; these transfer the torque acting in the transmission shafts 1 and 2 through the contact pressure rings 16, 17 to the conical disks 4 or 6 and at the same time supply the axial torque-proportional contact pressure forces.

The second conical disks 3 or 5 of each set of disks are connected to the associated conical disks 4 or 6 so as rotate with these, but so as to be capable of axial displacement. The sets of disks 3, 4 and 5, 6 are encircled by a transmitting element 26.

Figure 2:
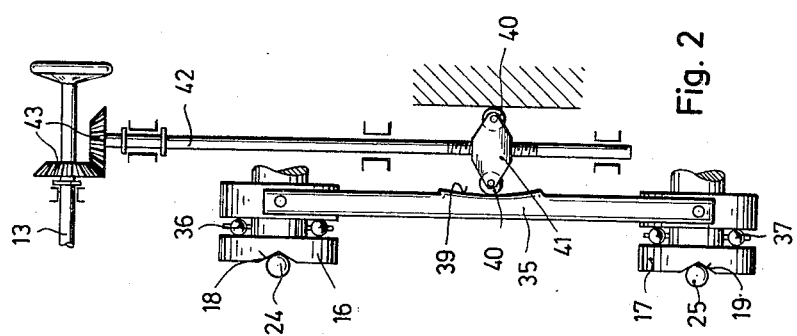

The forms of embodiment of the transmission according to the invention and shown in FIGURES 1 to 3 demonstrate how the initially mentioned disadvantages of the transmission described with reference to FIGURE 1A can be avoided with simple constructive means. In the following description, reversion will be made to the statements concerning the known transmission according to FIGURE 1A, for which reason parts performing the same function are provided with the same reference numbers.

As opposed to the transmission described with reference to FIGURE 1A, the transmission according to the invention and depicted in FIGURE 1 shows some additional constructive details which are not depicted in FIGURE 1A, such as for instance the thrust bearings 30 to 33 arranged between the control levers 7 and 8 and the conical disks 3, 4 and 5, 6, as well as the tensioning spindle 34 for the transmitting element, by means of which the swivel journals 9 and 10 of the control levers 7 and 8 can be moved towards and from each other for the purpose of correctly setting the transmitting-element bias.

The essential inventive difference in the constructive design consists of the fact that in the case of the known transmission according to FIGURE 1A the control lever 8 engages in the contact pressure rings 16 and 17, whereas in the case of the transmission according to the invention and depicted in FIGURE 1 it engages in the hubs 22 and 23 of the conical disks 4 and 6, meaning that it supports these conical disks directly through the thrust bearings 31 and 33, and that the contact pressure rings 16 and 17 of the two contact pressure devices are mutually supported through an additional slewable transfer lever 35 by thrust bearings 36 and 37.

In the case of the form of embodiment according to FIGURE 1, the transfer lever 35 is slewable about a fixed fulcrum 38 on the tensioning spindle 34 for the transmitting element. As a result of this construction, the operational behaviour of such a transmission is fundamentally changed.

The contact pressure devices on the driving shaft and on the driven shaft again supply—in the same manner as in FIGURE 1A—torque-dependent contact pressure forces through the corresponding conical disks to the transmitting element, and their reaction forces act on the transfer lever 35. Therefore, when passing through the ratio range, the larger contact pressure force is generated here too, on the one hand by the contact pressure device on the driving side and on the other hand by the contact pressure device on the driven side. However, since the transfer lever 35 acts in the manner of a balance beam, the same axial force obtains on the two contact pressure devices at each ratio position, namely the larger contact pressure force which is generated in each case by one of the two contact pressure devices. By this means, the smaller contact pressure force generated in the other contact pressure device remains ineffective for the contact pressing of the associated conical disk. It is present in the contact pressure device merely as in internal force, such as is also the case for example with a fully compressed spring.

Now, the fact that the spreading force exercised by the transmitting element is always greater at the power input than at the power output, is one of the known properties of cone-pulley transmission. In the case of the transmission according to the invention in FIGURE 1, this additional spreading force (control force) is taken up by the control levers 7 and 8 through the bearings 30 and 31. Consequently, at none of the adjustable ratio conditions can a load surge result in the transmission tending to increase its driven speed. Likewise, a change of the contact pressure device—determining the contact pressure force—in the vicinity of the ratio 1:1 cannot lead to that jump in speed which occurs in the case of hitherto known transmissions. On the contrary, what takes place is merely a swinging of the transfer lever 35, as a result of which however the conical disks and the encircling element do not change their position.

It may also be recognised from the foregoing considerations that the support of the conical disks 5 and 6 through the bearings 32 and 33 to the transfer levers 7 and 8 is superfluous if shaft 1 of the transmission according to FIGURE 1 always remains the driving shaft. However, if it is to be expected that the direction of forces through the transmission is reversed during operations, meaning that the driven shaft becomes the driving shaft, then both sets of disks 3, 4 and 5, 6 must be supported against the control levers 7 and 8.

In a further development of the invention, and with a transmission in accordance with FIGURE 1, there is also the possibility—to be obtained with very simple constructive means—of additionally influencing the contact pressure forces as a function of the ratio. FIGURE 2 depicts such a possibility and shows merely the transfer lever, parts of the contact pressing devices and of the adjusting spindle of FIGURE 1. In this connection, the transfer lever 35 has on the side which is directed away from the plane of the transmitting means, at about the middle point between its points of application on the two contact pressure devices, a curved surface 39 with which it supports itself against a surface rigidly attached to the transmission, the supporting force being transmitted through a threaded nut 41 having a roller 40 on both sides. The threaded nut 41 sits on a threaded spindle 42 which is connected with the adjusting spindle 13 by means of a bevel gear 43. With this arrangement, when the transmission ratio is changed, then the fulcrum and consequently the lever ratio of the transfer lever 35 are also changed, and by this means one approaches very closely to the very best contact pressure forces if the curved surface 39 is suitable designed.

Figure 3:
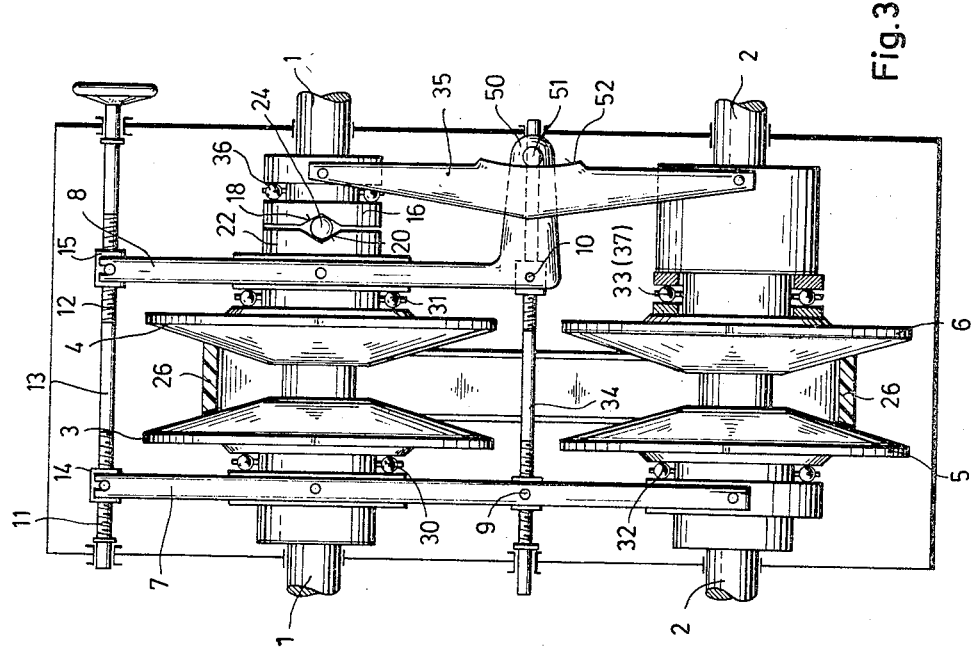

FIGURE 3 shows further form of embodiment of the transmission according to the invention. Here, too, parts performing a like function are provided with the corresponding reference numbers. In the case of this transmission, a contact pressure device consisting of a contact pressure ring 16 with V-shaped cuts 18, roller members 24 and V-shaped cuts 20 in the hub of the conidisk 4 is provided only on the driving shaft 1, whereas there is absolutely no such contact pressure device on the driven side. Moreover, the control lever 8 extends only to the transmitting-element tensioning spindle 34 on which it is arranged so as to be slewable about the swivel journal 10. This control lever 8 has a continuation piece 50 which is directed away from the plane of travel of the transmitting element, which runs along the transmitting-element tensioning spindle 34 and which carries at its outer end a journal 51, against which the transfer lever 35—similar in design to FIGURE 2—with a curved surface 52 is supported. Also in the case of this form of embodiment of the transmision according to the invention, the reaction forces generated by the contract pressure device on the driving side is transferred through the transfer lever 35 to the driven side and acts there as a contact pressure force. Since with each ratio of such a cone pulley transmission the spreading force generated at the driving side by this contact pressure force is greater than the contact pressure force on the driven side, the control levers 7 and 8 taking up the difference in force occurring thereby on the driving side, then here, too, the described disadvantages of the known transmission according to FIGURE 1A are avoided. In the case of this form of embodiment according to FIGURE 3 with only one contact pressure device on the driving side, the interchangeability of driving and driven shaft is of course forfeited.

I claim:
1. Infinitely variable cone pulley transmission with a transmitting element running between two sets of disks wherein the ratio is adjustable by means of a pair of control levers slewably arranged between the sets of conical disks, a contact pressure ring constituting a contact pressure device for generating the axial contact pressure forces which are in proportion to the torque and which act on at least one of the axially movable conical disks of at least one of the sets of disks, said contact ring transferring the torque and being axially displaceable but nonrotatable relative to the transmission shaft, said contact pressure ring and said axially movable disk having facing inclined surfaces, and roller members arranged between the inclined surfaces, whereby the torque is transferred to the axially displaceable conical disk and in doing so generates a contact pressure force in which
   first means are provided to support solely the control forces necessary for setting, maintaining and changing the ratio, said first supporting means comprising said pair of slewable interconnected control levers operatively connected to the conical disks of at least one set of disks, and that second means are provided for supporting the additional forces resulting from the contact pressure and directed away from the plane of movement of the transmitting element and vertical to said plane, said second supporting means comprising a separate lever which is slewable relative to the transmission, and is operatively connected to at least one of said control levers and to said contact ring.

2. Transmission according to claim 1, in which one contact pressure device is provided for each of the two sets of disks, and in which said separate lever is operatively connected to both the contact pressure rings of said pressure devices so as to support the reaction forces acting on the contact pressure rings.

3. Transmission according to claim 1, in which a contact pressure device is provided for only one of the two sets of disks, and in which said separate lever is operatively connected to the contact pressure ring so as to support the reaction force acting on the contact pressure ring and the spreading force of the transmitting element acting on the other set of disks.

4. Transmission according to claim 1, in which means are provided to alter the position of the slewing axis of the separate lever as a function of the ratio of the transmission.

5. Transmission according to claim 1, in which the control lever has an extension thereon adjacent to the transfer level in the neighborhood of its slewing axis directed transversely to the longitudinal direction of the lever, said extension having a swivel journal against which the separate lever is supported with a curved supporting surface, the line of contact between the swivel journal and the supporting surface moving along the supporting surface when the control lever goes through a slewing motion.

6. Transmission according to claim 4, in which separate lever lies against a pair of supporting rollers and in which means are provided to displace the supporting rollers in the longitudinal direction of the separate lever as a function of the transmission ratio and in which one of the supporting rollers engages the lever while the other roller is supported against a surface rigidly connected to the trasmission.

References Cited
UNITED STATES PATENTS

| | | | |
|---|---|---|---|
| 3,035,452 | 5/1962 | Ingellis | 74—230.17 |
| 3,097,540 | 7/1963 | Berens | 74—230.17 |
| 3,138,033 | 6/1964 | Glasson et al. | 74—230.17 |

MILTON KAUFMAN, Primary Examiner

J. A. WONG, Assistant Examiner